United States Patent
Randall et al.

(10) Patent No.: US 6,318,721 B1
(45) Date of Patent: Nov. 20, 2001

(54) APPARATUS FOR DETECTING THE ILLUMINATION OF A PLAYER-OPERATED GAMING MACHINE BUTTON

(75) Inventors: Dov Liam Randall, Manchester; Christopher Butler, Repton, both of (GB)

(73) Assignee: IGT-UK Limited (GB)

( * ) Notice: Subject to any disclaimer, the term of this patent is extended or adjusted under 35 U.S.C. 154(b) by 0 days.

(21) Appl. No.: 09/339,719

(22) Filed: Jun. 24, 1999

(30) Foreign Application Priority Data

Jun. 27, 1998 (GB) .................................................. 9813859
Jan. 7, 1999 (GB) .................................................. 9900253

(51) Int. Cl.[7] ........................................................... A63F 5/04
(52) U.S. Cl. ..................................... 273/148 R; 273/138.2
(58) Field of Search ................................ 273/138.1, 139, 273/138.2, 148 R; 250/215, 526, 214.1; 200/61.1, 52 R, DIG. 23, DIG. 36

(56) References Cited

U.S. PATENT DOCUMENTS 5,803,453 * 9/1998 Stephan et al. .................... 273/138.2

* cited by examiner

Primary Examiner—Raleigh W. Chiu
(74) Attorney, Agent, or Firm—George H. Gerstman; Seyfarth Shaw

(57) ABSTRACT

An operation device is attached externally, e.g., by magnetic tape to a coin-operated entertainment machine, the machine have an actuable player operable button such as a stop button or a gamble button. The device is operable to detect when the player operable button is actuable and, in response, to operate the button. The device may detect the actuability of the button by, for example, detecting the illumination of a lamp in the button or other part of the machine, or by detection of a change in voltage/current associated with the button's actuability. In a preferred embodiment, the button is a push button and the operation device is attached so as to bridge the button. The device incorporates a cam mechanism to operate, i.e., push, the button on detection of an appropriate signal indicating that the button is actuable. In another embodiment, the device incorporates a solenoid-operated member to operate the button.

17 Claims, 2 Drawing Sheets

APPARATUS FOR DETECTING THE ILLUMINATION OF A PLAYER-OPERATED GAMING MACHINE BUTTON

This invention relates to an operation device for use with player-operable entertainment machines particularly but not exclusively coin-operated amusement machines such as a 'fruit' or 'poker' or slot machine having symbol-bearing reels rotatable behind a window, and with which a game is played involving random (or pseudo random) selection of symbol combinations after actuation of the machine with coins. An award is made (or made available) to the player in the event that a predetermined winning combination is attained.

As used herein the term coin-operated is intended to cover operation by coins, tokens, banknotes, charge or credit cards or any other means of supplying credit or monetary value.

With such machines it is often the case that players seek to increase the rate at which games are played to increase the number of opportunities for winning.

One object of the present invention is to facilitate increased rate of playing of such machines and a further object is to provide promotional opportunities.

According to the invention therefore there is provided an operation device for use with a coin-operated entertainment machine having an actuable player operable button, the operation device being attachable externally to the machine and, in use, being operable to detect when the button is actuable and in response thereto to operate the button.

With this arrangement a player operable button on a coin-operated entertainment machine may be automatically operated when the button is rendered actuable.

In this way an increased rate of play is possible. Also in so far as an externally attachable device is made available to the player, there are promotional opportunities in that the device may be, for example, provided as a gift and/or personalised or bear adverts, etc.

The operation device may be used on any suitable coin-operated entertainment machine having a player operable button but, preferably, the machine is of the kind having a simplified game having a single player operable button.

However, the operation device could also be used with a coin-operated entertainment machine having a plurality of player operable buttons.

The machine may be a reel-type machine as described above.

The (or each) player operable button may be any button to be operated by the player, for example, where the machine has one or more rotatable symbol-bearing reels which have to be brought to rest by the player, the button may be a 'stop' button operable arrest rotation of the or each reel. In the case of a machine where the reels are stopped by the machine control circuitry, the button may be a 'nudge' button which rotates the reel by a predetermined amount or a 'hold' button which 'holds' one reel stationary whilst other reels are allowed to rotate.

The button may also be a 'gamble' button which can be operated in the event of a win to gamble the award made available. For example, the machine may display a number of symbols indicating payout multiples (×2,×3,×4 etc.) and the player attempts to select the highest multiple (to maximise the payout) by operating the gamble button when the appropriate symbol is illuminated.

The button may also be part of a supplementary games feature.

This may be provided by a supplementary display region (which is additional to a main (reel) display region) and which may be selectively illuminated to represent movement along a track or path, eg. simulating the playing of a board game, or to represent or record the selection of numbers of other symbols, eg. simulating the playing of roulette. The button may be provided on or be part of the supplementary display region, or any other suitable part of the machine.

The button may be any kind of button such as a push button or a mechanical contact button or switch of any kind or a touch, sensitive (eg. capacity or inductive) proximity sensitive button, switch or screen.

Where the machine has more than one button, the device may be operable to operate one or a selection or all of the buttons.

Where more than one button is to be operated, a plurality of devices may be provided, interconnected in any suitable arrangement using for example an adjustable bracket arrangement. Each device may be operable to operate one or more of the buttons.

The operation device may be operable to detect when the button is actuable by any suitable sensor.

The sensor may be able to detect actuability of the button in any suitable way. The type of sensor may depend on the way in which the actuability of the button is signalled to the player.

For example, the button may incorporate a lamp which may be a light emitting diode (LED) or any other lamp or an optical passageway linking the button to a separate light source and the lamp may be illuminated to signal when the button is actuable. Accordingly, the sensor may be photo-sensitive.

Alternatively, a part of the machine remote from the button may signal that the button is actuable, for example, illumination of a lamp on or in a part of the machine which is remote from the button. The lamp may be located behind a window as part of an additional feature game eg. snakes and ladders or a gamble feature game as described above.

Alternatively, the sensor may be operable to detect a change in voltage or electric current etc. applied to the button or any other part of the machine when the button is rendered actuable.

The operation device may operate the button using any suitable operator means, for example, by means of a mechanical, electrical or electronic switch mechanism or a cam mechanism. Where the button is a push button, preferably the operator means is operable to push the button.

In the case of a touch or proximity sensitive button or screen, this may operate in response to detected changes in electrical, electrostatic, thermal or other characteristics. Accordingly, the operation device may operate the button by generating an appropriate electrical, electrostatic, thermal etc. signal.

Any suitable cam mechanism may be used and may comprise a cam which is rotatable between one or more positions, in at least one of which the cam presses the button. Alternatively an intermediary member may be used such as a cam follower which may be acted on by the cam to operate the button.

The cam may be driven by any suitable means, for example, by an electric motor. Where the cam is driven by a motor it may be connected to the motor by a camshaft. The cam may be an integral part of the camshaft such as a suitably shaped length of the shaft.

The cam may be any cross section, for example, oval.

Alternatively or additionally, the operation device may incorporate a solenoid-operated member to operate the button.

The solenoid and member may take any suitable form, the member being movable directly or indirectly by the solenoid. The member may, for example, be an elongate rod or plunger movable in axial alignment with the solenoid towards and away from the button. Alternatively the member may be the cam as described hereinabove.

Preferably the sensor is connected, eg. electrically, to the operator means in order that the sensor may signal the actuability of the button to the operator means.

The operator device may be powered in any suitable way, but preferably the device incorporates its own power source such as a battery.

With this arrangement the operation device can be a convenient self-contained unit requiring no connection to an external power source and there is no need, for example, to access the entertainment machine's internal circuitry.

Where a battery is provided, the operation device may also include a power indicator device such as an LED connected to the battery to indicate that power is available.

The operation device may include a housing, and any or all of the above described components may be located therein.

The housing may take any suitable form but preferably is configured so that, in use, it can be positioned on the button to locate the operator means adjacent the button.

In one embodiment the housing comprises a bridge member which straddles the button and may be supported in such a position by two legs attached at respective opposite ends of the bridge member.

Where the device incorporates a cam mechanism, preferably the mechanism may be located in the bridge member to position the cam adjacent the button.

Where the cam rotates between a plurality of positions, in at least one position at least a portion of the cam may project from the housing to press the button.

The housing may provide a portion which can be personalised or decorated with corporate emblems, advertisements etc. for promotional purposes.

Where a power indicator is provided, this may be located on the housing so as to be visible to the player when the operation device is attached to the machine.

Where the operation device incorporates a sensor, this may be housed in the housing, or alternatively it may be housed in a separate sensor housing.

The sensor housing may be connected to the device by wires or alternatively or additionally the two housings may each be provided, with an arrangement of transmitter and receiver device's to allow communication between the sensor and operator means.

The operation device may be attachable externally to the machine by any suitable means but preferably the device incorporates a self adhesive material. The self adhesive material may comprise magnetic tape, which enables the operation device to be attached to any part of the machine having magnetic properties such as a stainless steel panel or frame on which the button is mounted.

Where the operation device includes a housing, preferably this is attachable to the machine for example by self adhesive material.

Where a number of operation devices are provided and interconnected by, for example, an adjustable bracket, preferably the bracket is provided with self adhesive material for attachment to the machine and/or the operation device.

Where the sensor is located in a separate sensor housing, this may also be externally attachable to any suitable part of the machine using self adhesive material as for the other housing.

It may be desirable to delay operation of the button.

Accordingly, the operation device may also include a timing device to time operation of the button. The timing device may be adjustable so that the timing of the operation of the button can be adjusted to suit the particular type of entertainment machine and the game(s) installed.

The invention will now be described further by way of example only with reference to the accompanying drawings in which.

Figure 1:
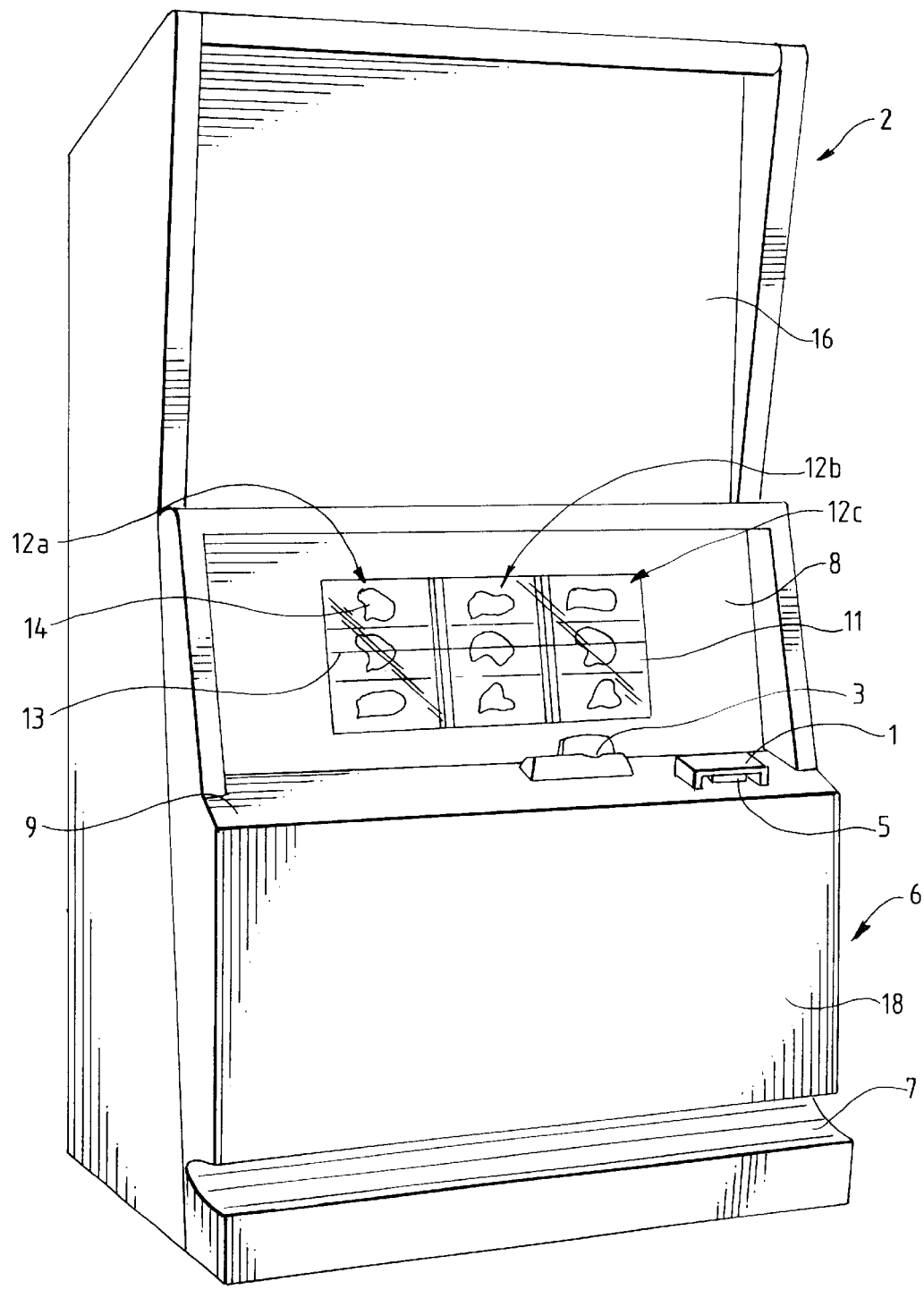
FIG. 1 is a perspective view of a device according to the invention attached adjacent a player operable button of a coin-operated entertainment machine.
Figure 2:
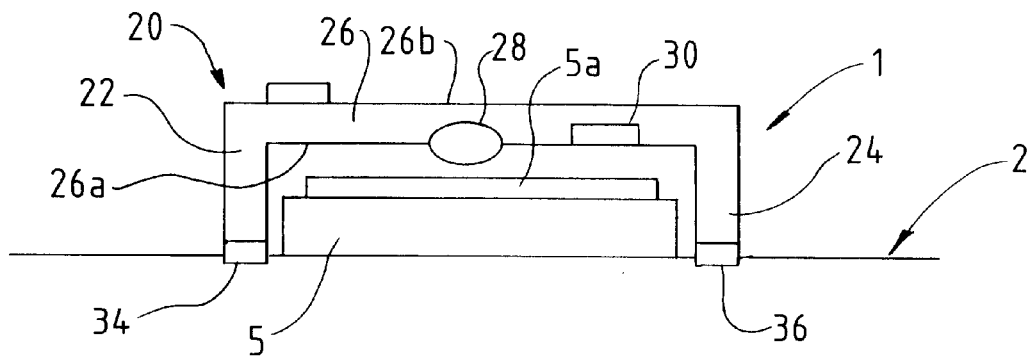
FIG. 2 is an enlarged schematic representation of the device and button of FIG. 1.
Figure 3:
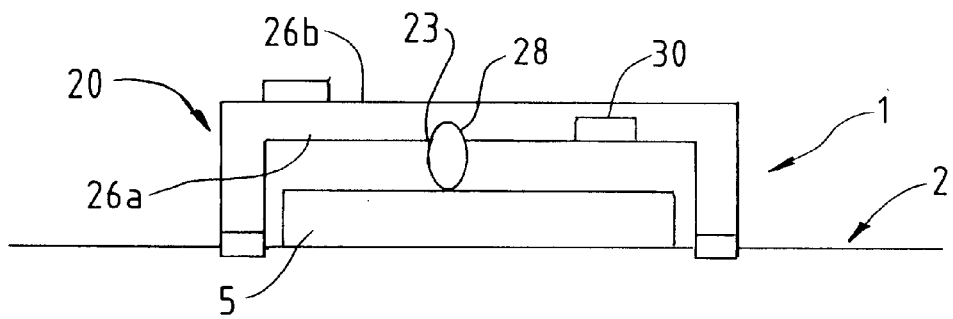
FIG. 3 is an enlarged schematic representation of the device and button of FIG. 1, the device shown operating the player operable button.
Figure 4:
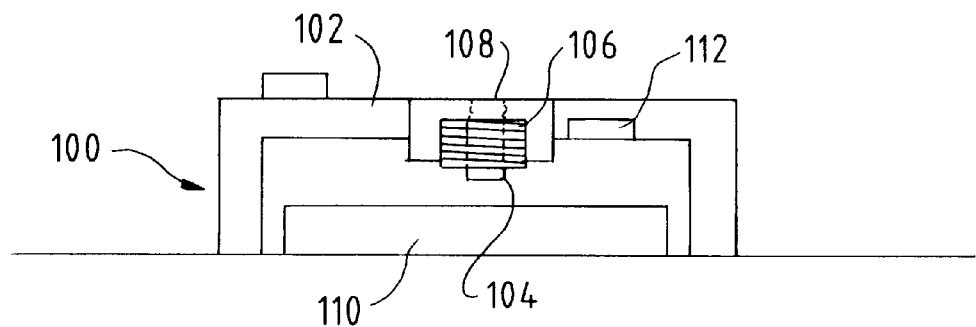
FIG. 4 is an enlarged schematic representation of another form of device according to the invention attached adjacent a player operable button of a coin-operated entertainment machine.

Referring to FIGS. 1–3, an operation device 1 is shown attached to a coin-operated fruit machine 2 which is the kind used in a casino and which offers a simplified game having a single player operable button 5.

The fruit machine 2 has a floor standing box shaped housing 6 with upper and lower printed glass panels 16 and 18 and a middle glass panel 8 in which a printed central region defines a window 11.

Adjacent the base of the panel 8 there is a coin slot 3 connected to a coin mechanism (not shown) and a button 5 all mounted on a stainless steel panel 9. The button 5 contains a lamp (not shown) which is an LED. Located at the base of the housing 6 is a payout opening 7 which is connected to a pay out mechanism (not shown).

Within the machine, three axially aligned reels 12a, 12b and 12c are mounted behind the panel 8 being disposed for rotation about a common horizontal axis and drivably connected to respective stepper motors (not shown). The reels 12a, 12b and 12c have twenty symbols 14 such as fruit etc. marked at evenly spaced positions about their peripheries. Each reel 12a, 12b, 12c can be arrested by the respective stepper motor in any of twenty stepping positions in which one symbol 14 is in precise registration with a horizontal win line 13 in the centre of the window 11.

The stepper motors are connected to a microprocessor based control unit (not shown) programmed with software operable to control the stepper motors so that a pseudo-random selection of symbol combinations can be selected. The microprocessor unit is also connected to the coin mechanism, the button 5 and the payout mechanism.

The operation device comprises a housing 20 having two spaced apart parallel elongate legs 22 and 24 attached to respective opposite ends of a rectangular box shaped bridge member 26. This has opposing sides: a first (in use, upper) side 26b and a second (in use, under) side 26a, the latter of which contains a central opening 23.

Housed within the bridge member 26 is a cam mechanism including a cam 28 which is drivably connected to an electric motor via a camshaft (not shown), both of which are mounted in the bridge member 26.

The cam is a short shaft which is oval in cross section having a maximum diameter and minimum diameter at right angles to each other. The cam is disposed to rotate with the camshaft between two positions: a first position in which the short diameter is parallel with the axis of the legs 22 and 24 and the cam is contained within the bridge member 26, and a second position in which the long diameter is parallel with the legs 22 and 24. In the second position a portion of the cam projects through the central opening 23 of the bridge member 26.

The motor is connected to a battery (not shown) and both these components are housed internally of the bridge member 26. Also connected to the battery and motor but housed externally on the underside 26a of the bridge member 26 is a photosensitive sensor 30 (or 'opto' sensor). An LED located on the upper side 26b of the bridge member 26 is connected to the battery to indicate the power supply of the device 1.

Each leg 22, 24 has a free end portion to which respective strips of self adhesive magnetic tape 34, 36 are fixed.

The upper side 26b of the bridge member is decorated with a corporate design.

Incorporated into the operation device is an adjustable timing device controlled by a micro chip connected to the battery and the motor.

In use the operation device is attached to the machine by positioning the magnetic tape to the steel frame 9 around the button 9 so that the bridge member 6 straddles the button 5. This locates the cam 28 (in the first position which is the default position) and the opto sensor 30 adjacent the button 5.

The machine 2 is actuated for the playing of games by insertion of coins into the coin slot 3. Conventional operation of the machine (not fitted with the actuation device) would require the player to press the button 5, the availability of this function being signalled by illumination of the lamp within the button in 5, through a translucent part thereof. The reels 12 are thus set in rotation by feed of train of impulses from the control unit to the stepper motors. After the button 5 is pressed the control unit switches the lamp off.

However, with the operation device in position adjacent the button, illumination of the button is detected by the opto sensor 30 which signals the motor (after a short delay) to rotate the cam from the first position to the second position in which it presses in button 5 (as shown in FIG. 2) initiating rotation of the reels 12a, 12b and 12c. The cam is then moved directly back to the first or default position. If the reels stop with a predetermined win combination of symbols 14 on the winning line 13, a win is attained. In this event, the control unit signals the payout mechanism and a payout of coins or tokens is made to the payout opening 7.

Referring to FIG. 3, another form of operation device 100 is constructed as described above except that in this embodiment a solenoid-operated member is used in place of the cam mechanism.

Housed within the bridge member 102 of the device 100 is a solenoid-operated plunger 104 comprising an elongate cylindrical plunger 104 of ferrous metal slidably located in axial alignment with the solenoid 106, the solenoid 106 being located within the bridge member 102 axially perpendicular thereto. One end of the plunger 104 is attached by a spring 108 to the bridge member 102, whereas the opposing end of the plunger 104 is free to contact the button under operation of the solenoid 106.

With the operation device in position adjacent the button 110 as described above, the illumination of the button 110 is detected by the opto-sensor 112. This signals activation of the solenoid 106 to move the plunger 104 axially relative to the solenoid 106, in a direction toward (so as to press) the button 110.

After the button 110 is pressed and the lamp is switched off the sensor signals de-activation of the solenoid and the plunger is thereby automatically retracted in the direction toward the bridge member (away from the button 110) under the action of the spring 108.

The operation device is relatively inexpensive to manufacture, compact and easily portable and also provides a convenient promotional device in so far as it is made available to players to take with them when they leave the casino.

It is of course to be understood that the invention is not intended to- be restricted to the details of the above embodiment which are described by way of example only.

What is claimed is:

1. An operation device for use with an entertainment machine having an actuable, player operable button, said operation device having a housing; a first device for reversibly attaching the operation device to the entertainment machine; a second device to detect a signal indicating that said button is actuable for game play; and a third device to actuate the button when the second device detects that the button is actuable.

2. The operation device of claim 1 in which said second device is a photosensor, positionable to detect lighting of said button.

3. The operation device of claim 1 in which said third device comprises a rotatable cam positionable to press said button in one rotatable position of the cam and to release said button in another rotatable position of the cam.

4. The operation device of claim 1 which said housing defines a bridge member which is positionable to straddle the button.

5. The operation device of claim 1 in which the first device for reversable attachment to said entertainment machine comprises at least one magnet.

6. The operation device of claim 5 in which said magnet comprises a plurality of lengths of magnetic tape.

7. The operation device of claim 5 in which said second device is a photosensor.

8. The operation device of claim 7 in which said third device comprises a rotatable cam positionable to press the button in one rotatable position of the cam and to release said button in another rotatable position of the cam.

9. The operation device of claim 5 in which said third device comprises a rotatable cam positionable to press the button in one rotatable position of the cam and to release said button in another rotatable position of the cam.

10. An operation device according to claim 10 which incorporates a solenoid-operated member to operate the button.

11. An operation device according to claim 10 which incorporates its own power source.

12. An operation device according to claim 11 incorporating a power indicator device connected to the power source to indicate that power is available.

13. An operation device according to claim 10 including a housing with a bridge member which can be positioned to straddle the button.

14. An operation device according to claim 13 in which in at least one position through which the cam rotates, at least a portion of the cam projects from the housing to press the button.

15. An operation device according to claim 12 or 13 in which the housing incorporates a magnet by which it is attachable externally to the machine.

16. An operation device according to claim 10 further including a timing device to time operation of the button.

17. An operation device according to claim 16 in which the timing device is adjustable so that the timing of the operation of the button can be adjusted.

* * * * *